United States Patent
Roy (10) Patent No.: US 6,697,341 B1
(45) Date of Patent: Feb. 24, 2004

(54) APPARATUS AND METHOD FOR PROVIDING MULTIMEDIA CONFERENCING SERVICES WITH SELECTIVE PERFORMANCE PARAMETERS

(75) Inventor: Radhika R. Roy, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/371,864

(22) Filed: Aug. 11, 1999

Related U.S. Application Data (60) Provisional application No. 60/112,741, filed on Dec. 16, 1998.

(51) Int. Cl.[7] .......................... H04L 12/16; H04Q 11/00
(52) U.S. Cl. ...................... 370/260; 370/261; 370/262; 370/263; 709/204; 709/205; 709/206; 379/202.01; 379/205.01; 379/203.01; 379/204.01
(58) Field of Search ................................ 370/260–263; 709/204–206; 379/202.01, 201–206

(56) References Cited

U.S. PATENT DOCUMENTS

| | | | |
|---|---|---|---|
| 5,687,095 A | * 11/1997 | Haskell et al. ............ 348/386.1 |
| 6,026,080 A | * 2/2000 | Roy ............................ 370/260 |
| 6,163,531 A | * 12/2000 | Kumar ....................... 370/260 |
| 6,226,265 B1 | * 5/2001 | Nakamichi et al. ......... 370/235 |
| 6,288,739 B1 | * 9/2001 | Hales et al. ................ 709/204 |

* cited by examiner

Primary Examiner—Wellington Chin
Assistant Examiner—Chuong Ho (57) ABSTRACT

An apparatus and method for providing multimedia conferencing services with selective performance parameters delivers a different representation of the same video signals to each of a plurality of users depending on the hardware limitations, software limitations, network limitations, and user preferences of each user device. Thus, each user can choose the quality of service he/she wants to receive in view of system limitations and cost considerations. The quality of service may be defined in terms of bandwidth, jitter, frame rate, and delay, for example. The apparatus includes a multimedia bridge that receives video signals from at least one of the plurality of users. The multimedia bridge scales-down the video signals as necessary before sending the video signals to the end users. The multimedia bridge also detects congestion occurring during the multimedia conference and scales-down the video signals, if necessary, to meet reduced network availability. In addition, the multimedia bridge accommodates changes in user preferences occurring during the multimedia conference and adjusts the video signals as necessary.

2 Claims, 6 Drawing Sheets

| DESCRIPTION | VIDEO FORMAT TYPE 1 | | | ... | VIDEO FORMAT TYPE N | | |
|---|---|---|---|---|---|---|---|
| | BAND WIDTH | DELAY | MOS | ... | BAND WIDTH | DELAY | MOS |
| USER 1: ADDRESS PARAMETERS: TELEPHONE NO. (555-999-1234), EMAIL ADDRESS, URL ADDRESS, ALIAS ADDRESS, SECURITY PARAMETERS, TRANSPORT [TCP/UDP] ADDRESS FOR AUDIO, VIDEO, DATA AND/OR SIGNALING, NETWORK ADDRESS [IP, ATM, AND/OR OTHER] VIDEO VARIABLES PARAMETERS FOR SCALING: QUANTIZATION FACTOR, DCT COEFFICIENT REDUCT., COLOR REDUCTION, AND/OR OTHER COMBINATION | $B_{F_{11}}$ (10 MEGA-BITS PER SEC) | $D_{F_{11}}$ (150 MSECS) | $M_{F_{11}}$ (4.0) | ... | $B_{F_{N1}}$ | $D_{F_{N1}}$ | $M_{F_{N1}}$ |
| USER 2: ADDRESS PARAMETERS: ⋮ | $B_{F_{12}}$ (5 MEGA-BITS PER SEC) | $D_{F_{12}}$ | $M_{F_{12}}$ | ... | $B_{F_{N2}}$ | $D_{F_{N2}}$ | $M_{F_{N2}}$ |
| USER 3: ADDRESS PARAMETERS: ⋮ | $B_{F_{13}}$ (10 MEGA-BITS PER SEC) | $D_{F_{13}}$ | $M_{F_{13}}$ | ... | $B_{F_{N3}}$ | $D_{F_{N3}}$ | $M_{F_{N3}}$ |
| ⋮ | ⋮ | ⋮ | ⋮ | ... | ⋮ | ⋮ | ⋮ |

Columns: 300 (DESCRIPTION), 301 (VIDEO FORMAT TYPE 1), 302 (VIDEO FORMAT TYPE N)

APPARATUS AND METHOD FOR PROVIDING MULTIMEDIA CONFERENCING SERVICES WITH SELECTIVE PERFORMANCE PARAMETERS

This nonprovisional application claims the benefit of U.S. provisional application No. 60/112,741 entitled "Multimedia Conferencing Services with Selective Performance Criteria" filed on Dec. 16, 1998. The Applicant of the provisional application is Radhika R. Roy.

BACKGROUND OF THE INVENTION

1. Field of Invention

The present invention is directed to an apparatus and method for providing multimedia conferencing services with selective performance parameters.

2. Description of Related Art

Multimedia conferencing over communication networks to a plurality of parties is generally known in the art. Multimedia conferencing in packet-switched networks such as asynchronous transfer mode (ATM), frame relay, and the like, is well known, as is multimedia conferencing in circuit-switched networks such as ISDN, PSTN and the like. However, in a conventional multi-party multimedia conferencing service, the service provided to all parties is the same and is based on the lowest common denominator of the performance capabilities of the parties. That is, the highest quality of the multimedia conference service provided to all the parties of the conference is limited to the highest quality performance capability of the least capable party. Thus, new technology is needed to increase the quality of multimedia conferencing for multiple parties to exceed the above limitation.

SUMMARY OF THE INVENTION

The invention provides a multimedia conferencing service to multiple parties where the performance of the service for each of the parties may be different. The performance for each party is selected based on the abilities of the device and/or the preferences of the party. When an operator of a source user device enters a destination address for another user device, data such as an identity of a source user device, destination user devices and performance parameters selected at the source user device are specified.

When the signals are received, a multimedia bridge retrieves related information from a database corresponding to the identity of the source user device and/or the destination user devices. The information may include default performance parameters for communicating with the user devices, such as bandwidth, allowable delay, allowable jitter, allowable packet losses and the like, and may include user-selected preferred performance parameters for use during the multimedia conference.

Based on the information retrieved and the data received, the multimedia bridge sends boot signals for resolving information or conferencing to the selected destination user devices involved in the multimedia conference. If alternate performance parameters are selected at one of the destination user devices, that information is sent to the multimedia bridge for use during the remainder of the multimedia conference.

Once the multimedia bridge receives the default and/or alternate performance parameters for each user device, the selective performance parameters for communicating between each user device are determined. The multimedia bridge enables the multimedia conferencing service to provide communication between the user devices using different selective performance parameters for each user device for the same multimedia conference call.

These and other features and advantages will be described in or are apparent from the following detailed description of the preferred embodiments.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
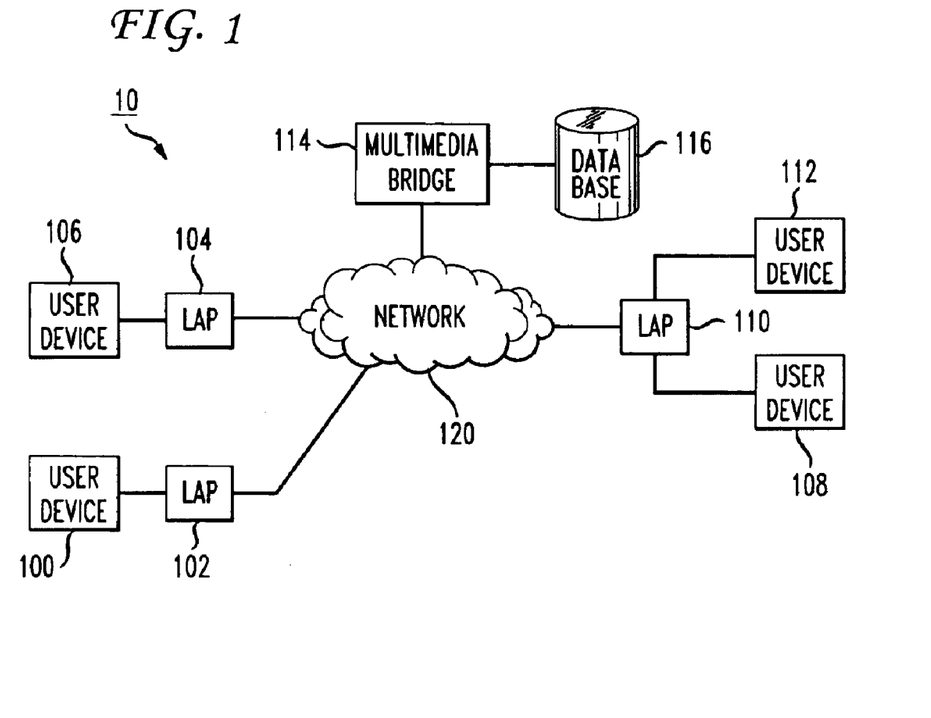
FIG. 1 is an exemplary block diagram of a multimedia conferencing system in which the invention operates.

FIG. 1 is an exemplary block diagram of a system 10 in which the invention operates. The system 10 includes a plurality of user devices 100, 106, 108 and 112 in communication with at least one network 120 through Local Access Providers (LAPs) 102, 104 and 110. The user devices 100, 106, 108, and 112 communicate with one another through the network 120.

The network 120 is further in communication with a multimedia bridge 114 that is, in turn, in communication with a database 116. Although FIG. 1 shows the multimedia bridge 114 as a separate device connected to the network 120, the multimedia bridge 114 may be located anywhere within the network 120 and may be combined with or included in one or more of the LAPs 102, 104 and 110 or one or more of the user devices 100, 106, 108 and 112. Multiple multimedia bridges 114 may be utilized with the network 120.

If an operator of the user device 100 wishes to communicate with the user devices 106, 108, 112, the operator need only activate the user device 100 and send start-up signals to the multimedia bridge 114. The start-up signals include information regarding the destination addresses, for example the telephone number, Universal Resource Locator (URL), transport/network layer addresses (TCP/UDP/IP, ATM, etc.), performance related information, and the like, of the user devices 106, 108 and 112. The multimedia bridge 114 sends start-up requests for resolving information or conferencing to the user devices 106, 108, 112. The user devices 106, 108, 112 respond by sending a start-up signal, having associated user device 106, 108 or 112 information, to the multimedia bridge 114 to establish a connection or to accomplish other multimedia conferencing functions. After having all required information, and once a connection is established with the other user devices 100, 106, 108 and/or 112 through the multimedia bridge 114, communication between the user devices 100, 106, 108 and 112 may commence.

The user devices 100, 106, 108 and 112 may be any devices that allow for the transmission of signals over communications links. For example, the user devices 100, 106, 108 and 112 may be any devices capable of sending and receiving multimedia conferencing services such as computers, video telephones, video conference apparatuses, and the like.

The user devices 100, 106, 108 and 112 are in communication with the network 120 through LAPs 102, 104 and 110 over communications links. These communications links may be any type of connection that allows the transmission of information. Some examples include conventional telephone lines, fiber optic lines, direct serial connection, cellular telephone connections, hybrid-fiber-coax (HFC) links, satellite communication links, and the like.

The user devices 100, 106, 108 and 112 send communication signals to one another over the communications links through LAPs 102, 104 and 110. The LAPs 102, 104 and 110 are devices that provide an interface to the network 120. The LAPs 102, 104 and 110 may include Local Exchange Carriers (LECs), Internet Access Providers (IAPs), satellite base stations, and the like.

The network 120 may be a single network or a plurality of networks of the same or different types. For example, the network 120 may include a local telephone network in connection with a long distance network. Further, the network 120 may be a data network or a telecommunications network in connection with a data network. The communication signals are received by the network 120 and are routed in the network 120 to the destination user device. The routing may be performed by the network (e.g., routers) or link layer entities (e.g., ATM).

The network 120 is further in communication with at least one multimedia bridge 114. The multimedia bridge 114 controls the setting of performance parameters for audio, video, and/or data used during the communication between a source user device (i.e., the user device initiating the communication) and destination user devices, as described below.

When the operator of a source user device, for example user device 100, sends start-up signals to the multimedia bridge 114—the start-up signals having associated user device 100 information such as the identity of the user device 100 and of the user devices with which communication is sought, for example—the multimedia bridge 114 receives the signals from the user device 100 and retrieves profile information from the database 116 corresponding to the identity of the user device 100 and/or the destination user devices 106, 108 and 112. The profile information may also include default performance parameters for each user device 100, 106, 108 and 112, along with other relevant information. This information can also be sent dynamically by the source user device 100 if it is known prior to the initiation of the multimedia conference. The multimedia bridge can also send this information to the called user devices to negotiate multimedia conference performance parameters dynamically.

Based on the profile information, or alternatively based on information supplied by the source user device 100, the multimedia bridge 114 sends start-up requests to the necessary user devices 106, 108 and 112 involved in the multimedia conference. If the start-up requests are accepted, the user devices 106, 108 and 112 send start-up signals with associated information back to the multimedia bridge 114.

The multimedia bridge 114 then establishes the multimedia conference among the user devices 100, 106, 108 and 112. In establishing the multimedia conference, the multimedia bridge 114 functions in a similar manner as is generally known in the art. For multimedia conferencing in selective mode, an adaptive function that will match the required performance criteria for each conferee is utilized. The user devices 100, 106, 108 and 112 may also have this adaptive function. However, it is assumed by the exemplary system 10 of FIG. 1 that the multimedia bridge 114 has this performance matching adaptive function. As a result, in this example, it is assumed that all multimedia conference calls, whether point-to-point or point-to-multipoint, pass through the multimedia bridge 114.

A user of the user device 100 may want to set up a multimedia conference call with user devices 106, 108 and 112. Start-up signals, i.e. a start-up request, are sent from the user device 100 to multimedia bridge 114 with the required information that may include the addresses of user devices 100, 106, 108 and 112, and corresponding performance related parameters that the source user device 100 desires for the multimedia conference. The multimedia bridge 114 retrieves the profile information from the database 116 for each user device 100, 106, 108 and 112.

The multimedia bridge 114 determines whether the start-up request is valid and/or has proper authorization. If the start-up request is not valid and/or authorized, the multimedia bridge 114 sends a rejection message to the user device 100. If the request is valid, the multimedia bridge 114 sends initiation signals to the user devices 106, 108, and 112. Upon receiving the initiation signals, the user devices 106, 108 and 112 determine the desired criteria for joining the conference call, such as the desired performance parameters. Each user device 106, 108 and 112 communicates the desired criteria for joining the multimedia conference to the multimedia bridge 114.

The multimedia bridge 114 examines the reply signals from the user devices 106, 108 and 112 and adapts the actual performance of the communication link to each user device 106, 108 and 112, using the techniques described hereafter, to achieve the desired performance parameters, taking into consideration the performance capabilities of the user devices 100, 106,108 and 112 and the network 120. The multimedia bridge 114 prepares itself to bridge this multimedia conference call in accordance with the criteria agreed upon by each party. It should be noted that all parties may not have the same performance parameters. It is also important to note that the receiving user device cannot expect better performance than that of which the sending user device is capable.

The multimedia bridge 114 then sends a reply message back to each of the user devices 100, 106, 108 and 112 confirming the fact that the multimedia conference call has been accepted. After receiving the confirmation of the acceptance of the multimedia conference call, the user devices 100, 106, 108 and 112 may start to communicate with one another using audio, video, and/or data, as desired. The multimedia conference continues until an end condition occurs.

It may also happen that some user devices 106, 108 or 112 may not be willing to join the multimedia conference call. The respective user devices 106, 108 or 112 that opt out of the multimedia conference call will not be connected to the call by the bridge 114 and a message indicating the user device 106, 108 or 112 declined to join the multimedia conference is transmitted to the calling party.

Using the above architecture, the performance parameters of the user devices 100, 106, 108 and 112 can be selected based on the identity of the user devices 100, 106, 108 and 112 and profile information stored in a database 116, as well as user-preferred performance parameters that may also be obtained from the profile information of the database 116 or negotiated dynamically at the time of the multimedia conference call setup. The user-preferred performance parameters override the default performance parameters stored in the database 116. Thus, the selected performance parameters may be determined based on the abilities of the user devices 100, 106, 108 and 112 involved in the communication and the preferences of the users. The selected performance parameters pertain to attributes of the multimedia conference signals.

Although the multimedia conference may include all types of media, i.e., video, audio and data, the operation of the invention will be described below primarily with respect to the transmission of video signals because the video signals are bandwidth intensive, as compared to the audio and data portions of the multimedia conference. For video signals, the selective performance parameters may include the bandwidth, bit rate, allowable delay, allowable jitter, and the like, of the video signals of the multimedia conference.

The audio and data portions of the multimedia conference are processed by the multimedia bridge 114 in accordance with known methods. In the case of audio information, the multimedia bridge 114 adds all audio data from all user devices 100, 106, 108 and 112 except the user device to which the bridged audio is sent. In the case of data, all user devices 100, 106, 108 and 112 send the data in an ordered form in accordance with certain schemes and protocols (e.g., ITU-T's T-120-Series Recommendations). The data from all sources is combined together accordingly and the resultant data is sent, by the multimedia bridge 114, back to the desired recipients according to the agreed-upon scheme.

Figure 2:
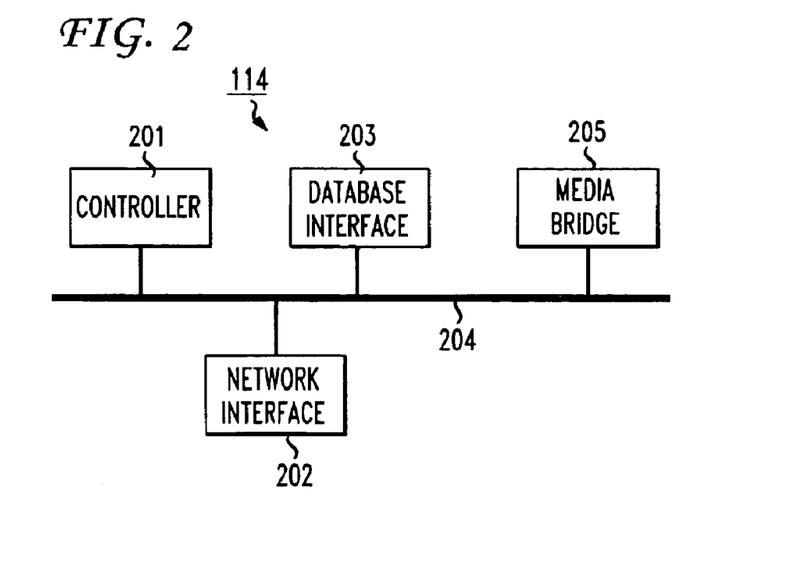
FIG. 2 is a block diagram of the multimedia bridge of FIG. 1.

FIG. 2 is a block diagram of the multimedia bridge 114 of FIG. 1. The multimedia bridge includes a controller 201, a network interface 202, a database interface 203, a media bridge 205 and a bus 204. The controller 201 controls the operation of the multimedia bridge 114 and directs communication between itself and the interfaces 202 and 203. The network interface 202 provides a communication pathway between the controller 201 and the network 120. The database interface 203 provides a communication pathway between the controller 201 and the database 116. The media bridge 205 provides the bridging function for each medium (e.g., audio, video, and/or data). The controller 201, interfaces 202, 203, and media bridge 205 communicate with one another over the bus 204.

The operation of the multimedia bridge 114 will now be explained with reference to an exemplary embodiment of the invention. In this example, it is assumed that three user devices 100, 106 and 112 are involved in the multi-party multimedia conference. However, the example operation is also applicable when there are any number of user devices involved in a multimedia conference.

When an operator of the user device 100 wishes to communicate with the operators of the user devices 106 and 112, for example, the operator of user device 100 chooses the performance parameters that he/she wishes to use and enters the address of the user devices 106 and 112 into the user device 100. The operator can choose preferred performance parameters to be used in the multimedia conference by way of, for example, booting the user device 100 with the selected performance parameters as a default, selecting the performance parameters from a list of available parameters, and the like.

Therefore, even though a user device 100, 106 or 112 may have the capability and resources to provide video signals using, for example, 10 megabits of bandwidth, the operator may choose to use only 5 megabits of bandwidth to reduce costs or for other considerations. Thus, the selective performance parameters that will ultimately be used in the multimedia conference will be based on the default performance parameters (i.e., system hardware and software capabilities and the like) and the user-preferred performance parameters.

The user device 100 transmits a start-up message to the multimedia bridge 114 containing identification information identifying the source user device 100, and the destination user devices 106 and 112, and the performance parameters that are desired to be used. The controller 201 of the multimedia bridge 114 receives the start-up signal through the network interface 202. The controller 201 then retrieves profile information corresponding to the destination user devices 106 and 112 from the database 116 through the database interface 203. The profile information retrieved from the database 116 includes a listing of the performance parameters that may be used when communicating with the destination user devices 106 and 112.

Table 1 shows an example of the video performance parameters for a given format. A video format is a function of the number of lines per frame, number of pixels per line, number of frames per second, and sampling rate of luminance and chrominance signal. For example, International Telecommunications Union-Telecommunications Section (ITU-T) 601 format contains 480 lines per frame, 720 pixels per line, 30 frames per second and 4:2:2 relative sampling rates of luminance and chrominance signals. Other ITU-T video formats, such as common Intermediate Format (CIF) and Quarter CIF (QCIF), may also be used.

Table 1 shows that bandwidth, delay, and mean opinion score (MOS) are the main performance parameters for a given video format. These performance parameters of a given video format are a fraction of frame rate, quantization rate, discrete cosine transform (DTC) coefficients, and color signals. The MOS is a function of bandwidth and delay. The bandwidth is a function of frame rate, quantization rate, DCT coefficients and color signals.

TABLE 1

| Video Format and Performance Parameter | | | |
|---|---|---|---|
| Video Format | Bandwidth | Delay | MOS |
| Video Format Type 1 | $B_1$ | $D_1$ | $M_1$ |
| Video Format Type 2 | $B_2$ | $D_2$ | $M_2$ |
| ⋮ | ⋮ | ⋮ | ⋮ |
| Video Format Type N | $B_N$ | $D_N$ | $M_N$ |

Table 2 provides an example of how video performance parameters (bandwidth, delay, and MOS) can be changed by varying the frame rate, quantization factor, DCT coefficients, and color reductions. The quantization factor determines the size of a step that can be taken for a unit of time for digitization of a signal. The larger the size of a step, the coarser the signal is, and the lower the bit rate (bandwidth) becomes. The quantization is related to the sampling of the signal.

TABLE 2

Video Format Parameters and Corresponding Performance Parameters

| Video Formatting Parameters | Bandwidth | Delay | MOS |
|---|---|---|---|
| Frame Rate Reduction: | | | |
| f1 | $B_{f1}$ | $D_{f1}$ | $M_{f1}$ |
| f2 | $B_{f2}$ | $D_{f2}$ | $M_{f2}$ |
| ⋮ | ⋮ | ⋮ | ⋮ |
| fm | $B_{fm}$ | $D_{fm}$ | $M_{fm}$ |
| Requantization factor: | | | |
| q1 | $B_{q1}$ | $D_{q1}$ | $M_{q1}$ |
| q2 | $B_{q2}$ | $D_{q2}$ | $M_{q1}$ |
| ⋮ | ⋮ | ⋮ | ⋮ |
| qx | $B_{qx}$ | $D_{qx}$ | $M_{qx}$ |
| DCT Coefficient Reduction: | | | |
| C1–C63 | $B_{C1-63}$ | $D_{C1-63}$ | $M_{C1-63}$ |
| C4–C63 | $B_{C4-63}$ | $D_{C4-63}$ | $M_{C4-63}$ |
| C9–C63 | $B_{C9-63}$ | $D_{C9-63}$ | $M_{C9-63}$ |
| ⋮ | ⋮ | ⋮ | ⋮ |
| Other Combinations | | | |
| Color Reduction: | | | |
| Remove all Chrominance Information | $B_{CY}$ | $D_{CY}$ | $M_{CY}$ |
| Remove all Chrominance Information except DC color | $B_{edc}$ | $D_{edc}$ | $M_{edc}$ |
| Remove DC color | $B_{dc}$ | $D_{dc}$ | $M_{dc}$ |
| Other Combinations | ⋮ | ⋮ | ⋮ |

For purposes of the description of the invention, motion Joint Photographic Expert Group (JPEG)-based video signals are utilized as an example implementation for providing the selective performance for each conference for a given network (e.g., ATM, IP, or others) of a given multimedia conference call. The motion JPEG video is a JPEG video signal which is sent at a certain frame rate. The JPEG video signal has been defined by International Organization for Standardization (ISO).

According to the ISO standard, a JPEG video signal is analyzed using a frequency domain analysis such as determining the cosine transformation. The coefficients of this transformation are known as the discrete cosine transform (DCT) coefficients. According to the ISO standard, only 64 DTC coefficients are considered. The first coefficient that does not contain any frequency component is known as the direct current (DC) coefficient. If these coefficients are changed, the bandwidth, processing delay, and MOS figures can also be changed. The video signal can also be separated into three components: luminance and two chrominance signals. Each component signal can also be analyzed using the frequency domain cosine transformation. Again, this cosine transformation of each component signal will also have 64 DCT coefficients.

The video performance can also be changed through varying the coefficients of the color components. Table 2 also shows some examples of how the bandwidth, delay, and MOS figures can be changed by varying those color components.

Figure 3:
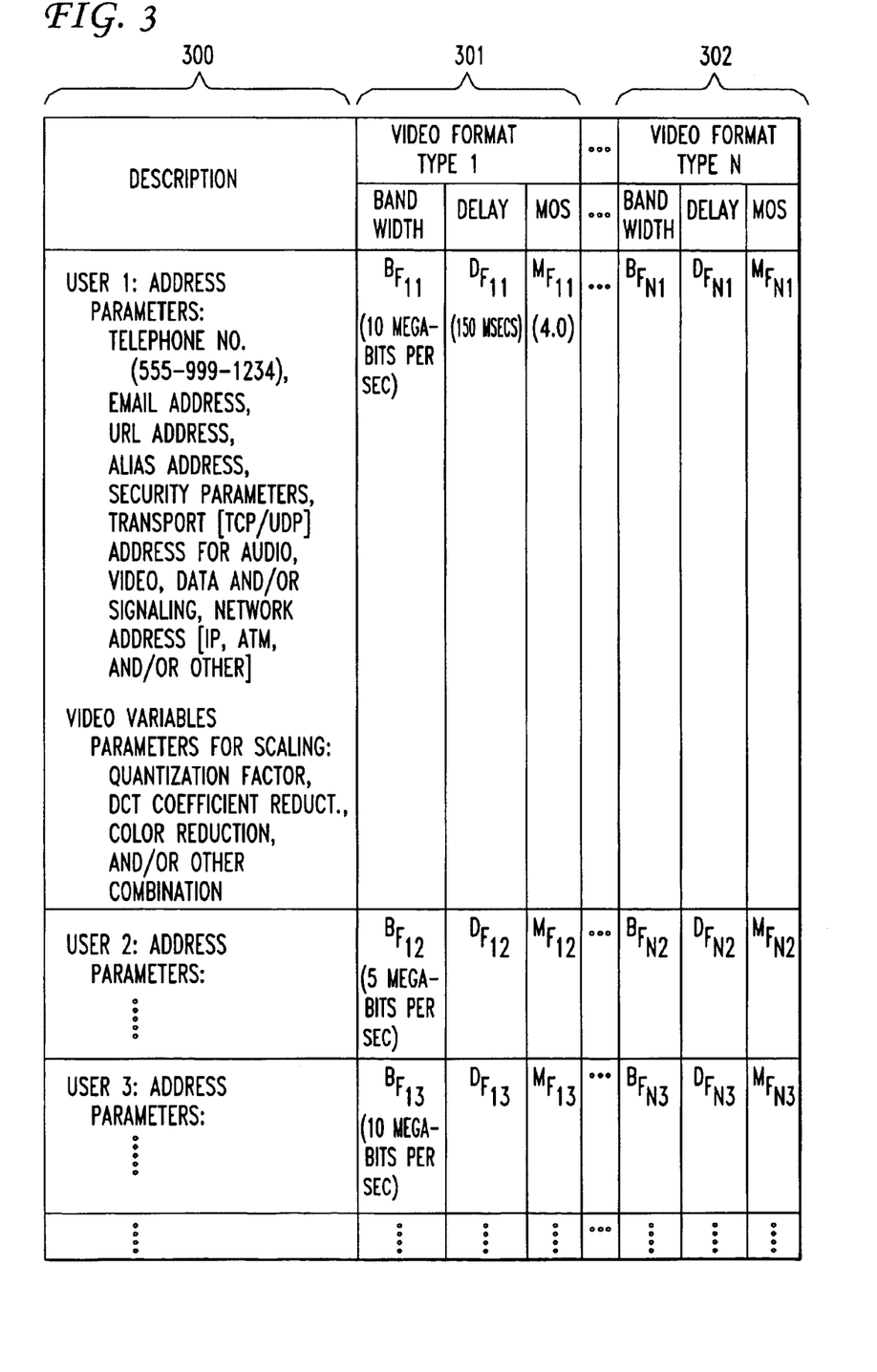
FIG. 3 is a exemplary data structure of the database of FIG. 1, which contains information related to performance parameters of the user devices of FIG. 1.

FIG. 3 is an example of a data structure of the database 116 according to the first embodiment. As shown in FIG. 3, the data structure contains listings 300 of destination information with video variable parameters for scaling and listings 301 and 302 of their performance parameters, preferences and default settings for scaling video signals corresponding to each of the destination information 300. Thus, when the multimedia bridge 114 retrieves profile information from the database 116 corresponding, for example, to the destination user device number 555-999-1234, the bandwidth performance parameter of 10 megabits is retrieved.

Alternatively, the multimedia bridge 114 may query the destination user devices 106 and 112 directly for the performance parameters and scaling parameters and the final performance parameters can be decided through negotiation. However, having to query the destination user devices 106 and 112 tends to slow down the operation of the multimedia bridge 114. The use of a database 116 to store profile information that is retrievable by the multimedia bridge 114 increases the speed with which communication can be initiated.

The controller 201 sends a set-up request to the user devices 106 and 112. Once the user devices 106 and 112 accept the request, the controller 201 can commence the multimedia conference. The user devices 106 and 112 may also send user-preferred performance parameters to the controller 201 of the multimedia bridge 114. The controller 201 can then determine the selected performance parameters from the default performance parameters retrieved from the database 116 and the user-preferred performance parameters sent from the user devices 100, 106 and 112.

Once the controller 201 determines the selected performance parameters for each user device 100, 106 and 112 of the multimedia conference, the controller 201 determines which signals can be communicated between user devices 100, 106 and 112 without modification and which signals need to be scaled-down before being transmitted to the respective user devices. For example, the selective performance parameters may indicate that user devices 100 and 106 are capable of, and prefer, sending and receiving 10 megabits of video signal bandwidth, but user device 112 is only capable of sending and receiving 5 megabits of video signal bandwidth. In that case, the controller 201 determines that the video signals sent from user device 100 do not need to be scaled before being transmitted to user device 106. Similarly, the video signals sent from user device 106 do not need to be scaled before being transmitted to user device 100. However, video signals sent from user devices 100 and 106 must be scaled-down before being transmitted to user device 112. Further, video signals sent from user device 112 are transmitted to user devices 100 and 106 without scaling, but the video signals are limited by the five megabits of video bandwidth used by the user device 112.

The video signals are sent through the media bridge 205 of the multimedia bridge 116 to perform scaling and/or bridging of all signals. The controller 201 helps to communicate with the media bridge 205 for performing scaling and bridging functions.

The video signals are scaled down by modifying parameters that define the video signal, such as the frame rate, the quantization, the discrete cosine transform (DCT) coefficients, the color and the like. The frame rate merely refers to the number of times that a screen image is refreshed over a given period of time. The refreshing of a JPEG image, for example, results in motion JPEG (MJPEG).

For example, consider that user device 100 is transmitting at 10 megabits per second for multimedia conferencing, and user devices 106 and 108 want to receive video at rates of 5 and 10 megabits per second, respectively. The user device 100 will be sending 10 megabits per second to the multimedia bridge 114. However, the controller 201 will be sending the signal to the media bridge 205 with the information that user devices 106 and 108 need to receive video at the rates of 5 and 10 megabits per second, respectively.

The media bridge 205 will perform the scaling from 10 to 5 megabits per second for user device 106 by changing the video parameters that meet the other desired performance parameters such as delay and MOS figures.

The scaled video will be sent to the user device 106 via the network interface 202. The video signal to be sent to the user device 108 needs to be scaled, but it needs to be switched to user device 108 by the media bridge 205 with the control information obtained from the controller 201. In addition, the media bridge 205 can also add or change other parameters when scaling the multimedia information. For example, additional graphics or text may be added.

The scaling techniques that are used to change the bandwidth, delay, and MOS figures, such as frame rate reduction, DCT coefficient reduction or color reductions, may be determined from the profile information stored in the database 116. Alternatively, the scaling techniques may be determined based on the information negotiated dynamically between the user devices 100, 106, 108 and 112 via the multimedia bridge 114.

During the multimedia conference, congestion may occur in the network 120 due to a lack of available resources. As a result, some conferees, i.e. user devices 100, 106, 108 and 112, may not get the desired level of performance for which the conferees have negotiated at the initiation of the conference. The information of the congestion will be propagated to the multimedia bridge 114 and the affected conferees. Receipt of this congestion information either by the multimedia bridge 114 or by the conferee(s) triggers a renegotiation of the performance parameters between the bridge 114 and the affected conferee(s).

The congestion might force the performance parameters, such as bandwidth, to be scaled down. The reduction of bandwidth can be done by varying video parameters, as described hereafter. This scaling down of the performance parameters may be renegotiated by the multimedia bridge 114 with the respective conferee(s). The multimedia bridge 114 has information, in database 116 for example, regarding the maximum performance parameters, such as bandwidth, allowed for each conferee under the congested conditions. The bridge and the conferee(s) may again scale up the bandwidth and/or other performance parameters through renegotiation once the congestion goes away.

For example, assume the multimedia bridge 114 is transmitting video signals with 10 megabits of bandwidth to user device 100 at a frame rate of 30 frames per second. If the network connection becomes congested, the multimedia bridge may need to reduce the video signal to 5 megabits of bandwidth. In order to send the same video signal at the lower bandwidth, the multimedia bridge 114 needs to scale down the video signal.

One option may be to reduce the frame rate to 15 frames per second. Another option may be to reduce the number of DCT coefficients used in processing the video signal. A third option may be to requantize the video signal. Requantization would entail reducing the number of bits used to represent the video signal. For example, an analog signal could be requantized to a target bit length, or a digital video signal could be reduced from a 16 bit representation to an 8 bit representation.

Yet another option may be to reduce the color characteristics of the video signal. For example, the multimedia bridge 114 can remove all chrominance information or all chrominance information except the direct current (DC) color information.

Of course, the multimedia bridge 114 can modify one or more of the above-described parameters to achieve the required performance. Further, the parameters used by the multimedia bridge 114 to scale down the video signal may be default parameters, system-dependent parameters or user-preferred parameters. The operational procedure for scaling down the video signal may be carried out by the media bridge 205 according to any method generally known in the art.

The controller 201 commences the multimedia conference by receiving the video from the initiating user device 100, scaling the video as necessary by the media bridge 205 and transmitting the video to the destination user devices 106 and 112, for example. The controller 201 can control what video is sent to which user device based on conventional switching principles and/or the choices made at each of the user devices 106 and 112. For example, the operator of user device 100 may choose to receive video of the speaker only, the operator of user device 106 may choose to receive video from all user devices, and the operator of user device 112 may choose to receive video from all user devices except his/her own. The manipulation of the video is done within the media bridge 205.

The controller 201 monitors the transmission of media information to and from the user devices 100, 106 and 112 and can also detect congestion in the communication links of the network 120. The monitoring and detection of congestion are performed in any known manner. If the controller 201 detects congestion in any of the communication links during the multimedia conference, the controller 201 adjusts the performance parameters to meet the reduced capability of the communication links so as to maintain the multimedia conference without disconnecting the user devices 100, 106 and 112. Thus, the controller 201 may override the selected performance parameters to maintain the multimedia conference.

The controller 201 is an application layer device whereas the network interface 202 is a network layer device. When controller 201 detects congestion, it may collect information from both higher layer resources (e.g., multimedia bridge 116 memories, buffers, CPU capacities, etc.) and lower network layer resources (e.g., link bandwidth, switch buffers, CPU capacities, etc). There can be many mechanisms for detecting congestion at the higher layer resources. Similarly, each network layer (e.g., IP, ATM, or other network) has its own congestion detection mechanisms. The controller 201 collects all congestion information from both higher and lower layer resources and based on the congestion information, the controller 201 determines how much scaling down of the video bandwidth is necessary to avoid congestion.

For example, if the controller 201 detects congestion in the communication link with user device 106 that reduces the available amount of bandwidth, the controller 201 may prompt each user device 100, 106 and 112 to inquire whether each user device 100, 106 and 112 wants to maintain the multimedia conference at a reduced quality of performance or whether the user devices 100, 106 and 112 wish to terminate the conference. For example, the controller 201 may send a message such as "Unable to meet selective performance parameters. Do you want to continue conference?"

If the operator of each user device 100, 106 and 112 chooses to continue the multimedia conference, user devices 100 and 112 receive a video signal of reduced quality and the controller 201 will scale-down the video signals being sent to user device 106 to meet the reduced bandwidth availability. The video parameters to be adjusted to scale-down the video signals and continue the conference may be set in the default field 302 of the data structure in FIG. 3 or may be a generally set default of the multimedia bridge 114. The default will generally be set to adjust the parameters that will result in the least degradation of video quality, the parameter that results in the least processing time, or the like. However, any parameter may be set as the default.

The "unable to meet selective performance parameters" message may further provide a listing of the parameters that are adjustable to maintain the conference and request that the user devices 100, 106 and 112 select a parameter to adjust. The process may be repeated until an appropriate parameter is adjusted to a level such that continuation of the conference is enabled or until the problematic user device 100, 106 or 112 discontinues the conference.

The messages sent to the user device 100, 106 and 112 may be in the form of graphical messages to be displayed, such as text and/or graphics, audible messages, or a combination of graphical and audible messages. Responses to the messages may be entered through the user device 100 by using a user interface such as a keyboard, microphone, speech recognition device, pointing device, telephone keypad, telephone handset, and the like.

As a practical example of the operation of the multimedia bridge 114, consider several engineers, Lisa, Michael, and Nicolas, wishing to communicate with each other in a multimedia conference. Lisa works for a large government contractor with sophisticated equipment and no financial constraints. Michael and Nicolas work for separate independent contractors. Michael has sophisticated equipment but is presently under financial constraints. Therefore, Michael wants to reduce costs by conferencing with a video signal bandwidth less than his system's capability. Nicolas has less sophisticated equipment and greater financial constraints. Lisa initiates the communication by turning on the user device 100 and sending signals to the multimedia bridge 114, including identification information for Michael's and Nicolas' user devices 106 and 112.

The signals sent from Lisa's user device are routed by the network 120 to the multimedia bridge 114. The multimedia bridge 114 receives the signals from Lisa's user device and retrieves information from the database 116 corresponding to Michael's and Nicolas' user devices 106, 112. The information indicates that Lisa and Michael have the ability to send and receive 10 megabits of video signal bandwidth, but Nicolas only has the capability of communicating with 5 megabits of video signal bandwidth.

The multimedia bridge 114 then sends a start-up request to Michael's and Nicolas' user devices 106, 112. Michael's and Nicolas' user devices 106, 112 send signals to the multimedia bridge 114 accepting the start-up request. Michael's acceptance signal also includes information notifying the multimedia bridge 114 that he only wishes to send and receive 5 megabits of video signal bandwidth. Thus, the multimedia bridge 114 completes the communication connection and initiates the multimedia conference.

The multimedia bridge 114 then carries on the multimedia conference by scaling the video signals provided by Lisa's user device 100 from 10 megabits bandwidth to 5 megabits. Video signals sent from Michael's and Nicolas' user devices 106, 112 are not scaled. In the event that Michael is unsatisfied with the video signal quality, Michael may decide to incur additional cost and receive a 10 megabit bandwidth video signal. In this case, video signals from Lisa would not be scaled before being transmitted by the multimedia bridge 114 to Michael and vice versa. However, the video signals sent from Lisa and Michael would have to be scaled-down from 10 megabits to 5 megabits before being transmitted to Nicolas. Nicolas' video signals would not be scaled, but would only be provided to Lisa and Michael at 5 megabits bandwidth.

The multimedia bridge 114 also monitors the transmissions between the user devices 100, 106 and 112 over the network 120, or networks, for congestion or other problems that diminish the video quality. If congestion appears in the network between Nicolas' user device 112 and the multimedia bridge 114, the multimedia bridge 114 notifies Lisa, Michael and Nicolas that Nicolas' video signal quality will be reduced. Alternatively, if the multimedia bridge sends and receives signals to and from Nicolas on different communication links, and if the communication link with congestion is the communication link sending signals to Nicolas, the multimedia bridge 114 may only notify Nicolas that his video signal quality will be reduced.

The multimedia bridge 114 then prompts Lisa, Michael and Nicolas as to whether they wish to continue or terminate the conference. If they wish to continue the conference, the multimedia bridge 114 will need to further scale down the video signals sent from Lisa and Michael to Nicolas and the video signals from Nicolas will be transmitted at a lower quality. The multimedia bridge 114 can scale the video signals in accordance with default parameters, or the multimedia bridge 114 may prompt Nicolas to select which parameters he wishes to use to scale down the video signals. Alternatively, Nicholas may elect to terminate the multimedia conference and the conference will continue with only Lisa and Michael.

Figure 4:
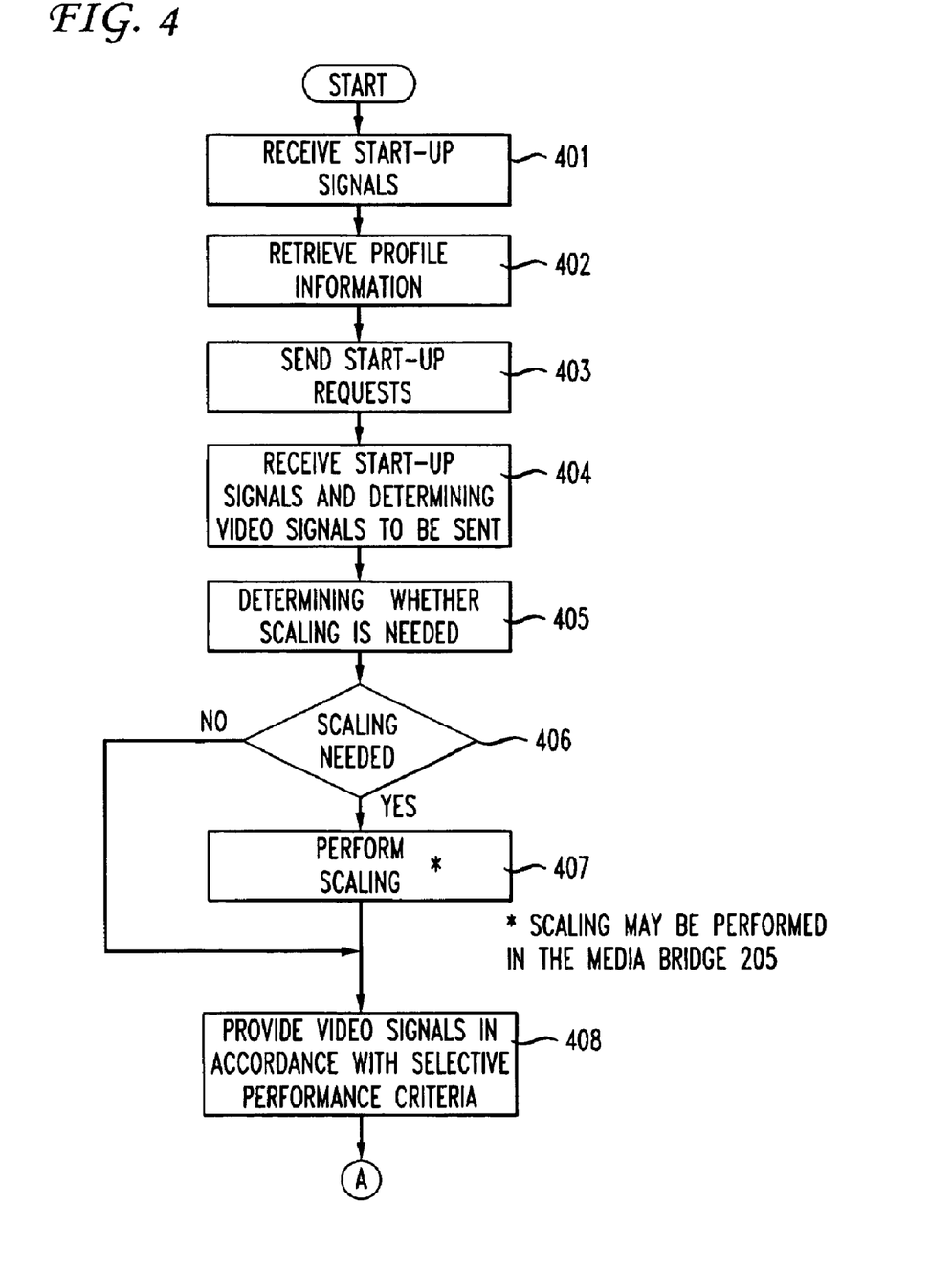
FIGS. 4 and 5 are a flowchart of the operation of the invention according to an exemplary embodiment.
Figure 5:
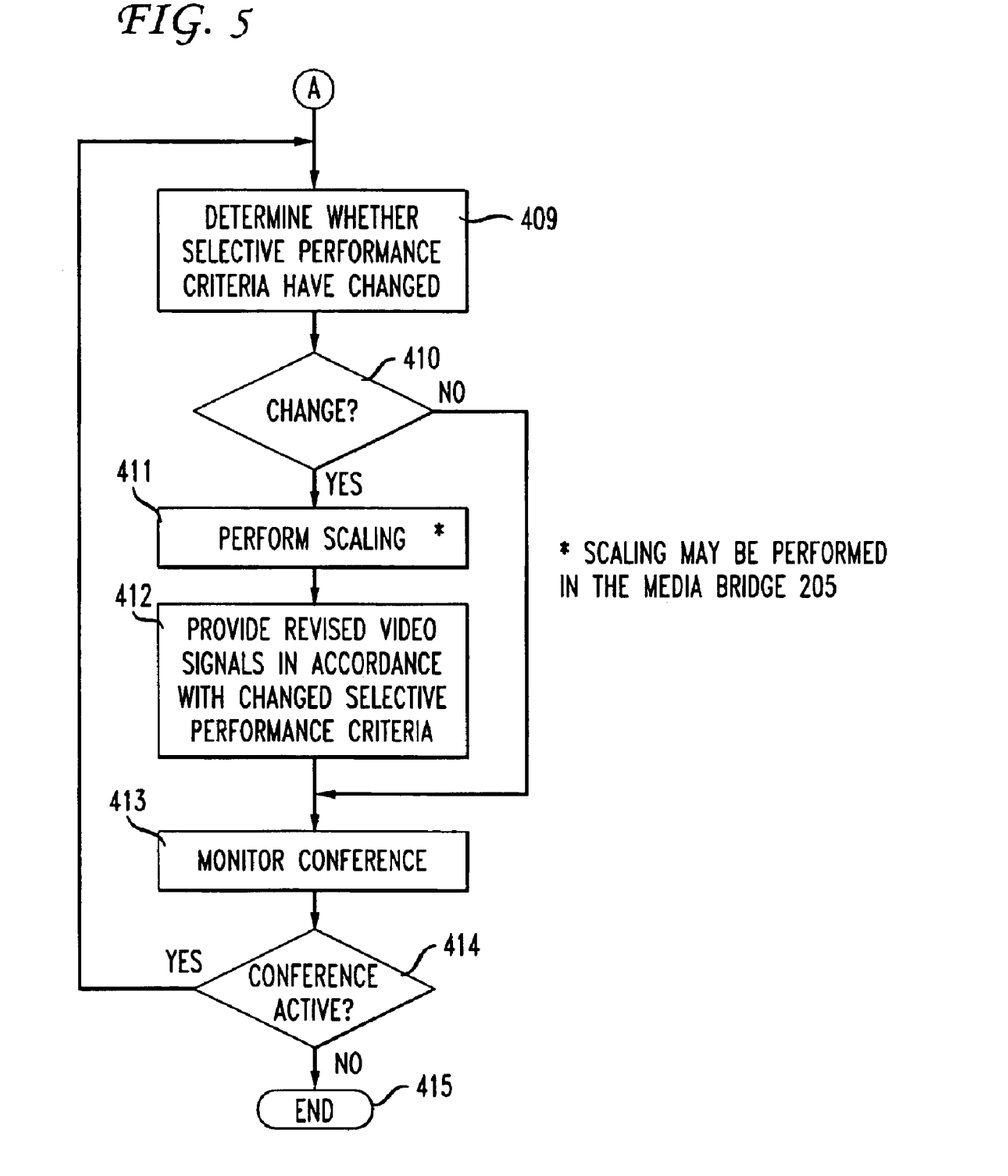

FIGS. 4 and 5 are a flowchart of an exemplary operation of the multimedia bridge 114 according to a first exemplary embodiment. In step 401, the controller 201 receives start-up signals through the network interface 202 from a source user device 100, for example, and goes to step 402. The start-up signals include identifying information that identifies the source and destination user devices 100, 106 and 112, for example. In step 402, the controller 201 retrieves profile information from the database 116 through database interface 203 corresponding to the source and destination user devices 100, 106 and 112 identified in the start-up signal and goes to step 403.

In step 403, the controller 201 sends start-up requests to the destination user devices 106, 112 and continues to step 404. In step 404, the controller 201 receives start-up signals from the destination user devices 106, 112 in response to the start-up requests and determines the video signals to be transmitted to and from each of the user devices and goes to step 405. As described above, this determination is made by checking the retrieved list of available communication modes for the destination user devices 106 and 112 for the occurrence of the selected communication mode.

In step 405, the controller determines whether the video signals transmitted from each user device need to be scaled, or transformed, before being transmitted to the other user devices and continues to step 406. In step 406, if any video signals need to be scaled before being transmitted to the other user devices, the controller 201 continues to step 407; otherwise the controller 201 jumps to step 408. The scaling may be performed within the media bridge 205 and includes manipulation of video signal(s) in accordance with the selected performance criteria.

In step 407, the controller 201 determines the transformation parameters for transmitting video signals between the user devices in accordance with the selective performance parameters of each user device. The operation for determining the transformation parameters is described in more detail below with respect to FIG. 5. Control then continues to step 408. The scaling may be performed within the media bridge 205, and includes manipulation of video signal(s) in accordance to the selected performance criteria.

In step 408, the controller provides each user device with video signals in accordance with the selective performance parameters for that user device and continues to step 409 (FIG. 5). In step 409, the controller determines whether there has been a change in the multimedia conference attributes due to network congestion or a change in user preferences. Control continues to step 410.

In step 410, if there has not been a change in the multimedia conference attributes, the controller 210 jumps to step 413; otherwise, the controller goes to step 411. Instep 411, the controller 210 determines the transformation parameters for transmitting video signals between the user devices in accordance with the new selective performance parameters of each user device. The scaling may be performed within the media bridge 205 to meet the desired performance of each user device 100, 106 and 112. The operation for determining the transformation parameters is described in more detail below with respect to FIGS. 6 and 7. The controller 201 then continues to step 412.

In step 412, the controller 201 provides each user device with video signals in accordance with the selective performance parameters for that user device and continues to step 413. In step 413, the controller 201 monitors whether the multimedia conference is active and continues to step 414.

In step 414, if the multimedia conference is still active, the controller 201 returns to step 410; otherwise the controller goes to step 415 and ends the operation. The end condition may be, for example, the disconnection of all but one of the user devices 100, 106 or 112, and the like.

Figure 6:
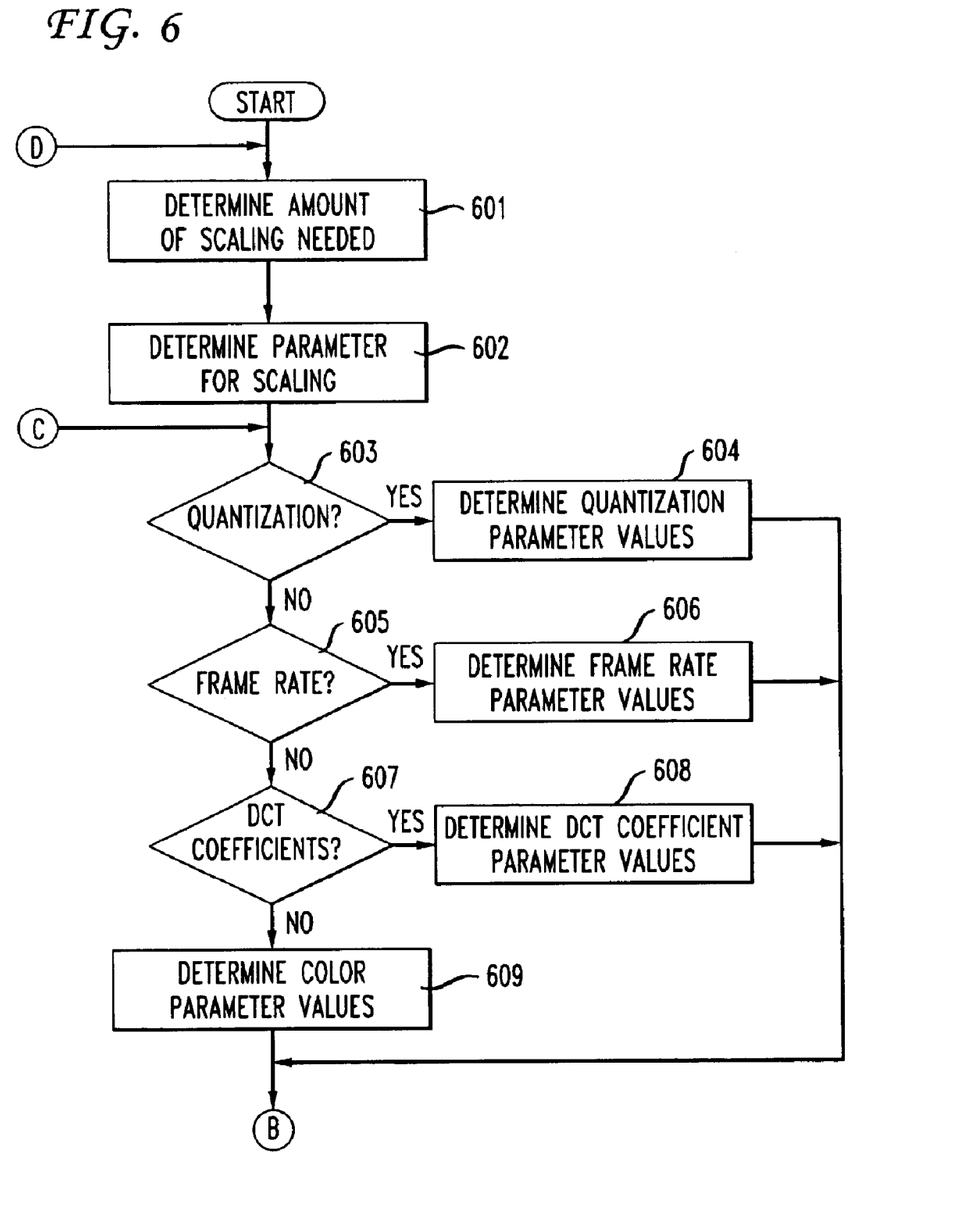
FIGS. 6 and 7 are a flowchart of an exemplary video transformation operation of the invention.
Figure 7:
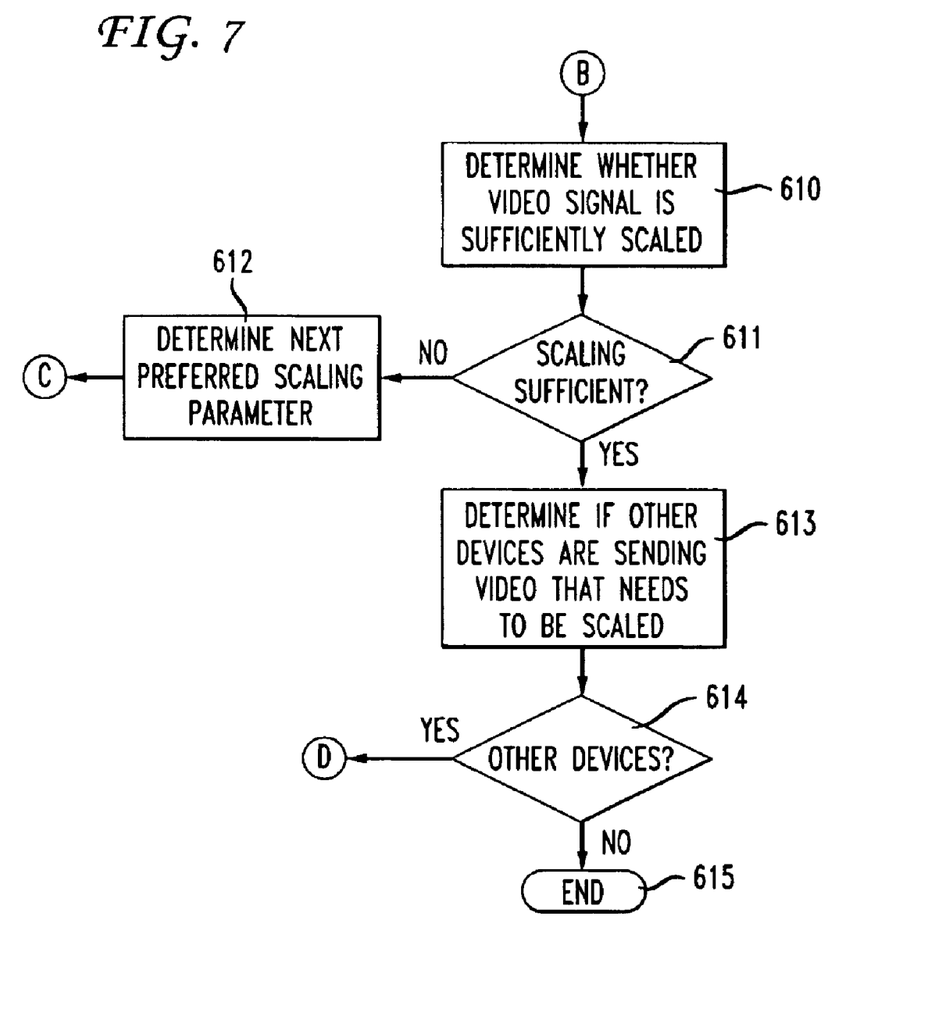

FIGS. 6 and 7 are a flowchart of an exemplary operation of video scaling, or transformation, performed by the multimedia bridge 114 according to a first exemplary embodiment. The scaling of video signals may be performed within the media bridge 205 in collaboration with the controller 201, database 203, and network interface 202.

The exemplary video scaling operation shown in FIG. 5 is performed for each user device that will receive a scaled down video signal, as determined in step 405 of the operation described above.

In step 601, the controller 201 determines the amount of scaling needed to scale-down a signal transmitted from a user device to be output on one of the particular user devices determined in step 405 above. For example, the controller 201 may first determine the amount of scaling needed to transmit a signal from user device 106 to user device 100. The controller 201 then continues to step 602.

In step 602, the controller 201 determines the parameters to be used to scale the video signals (i.e., frame rate, quantization, DCT coefficients, or color) based on the default information or the user-preferred preferences and continues to step 603. Tables 1 and 2 show complete details of all parameters that can be changed to have the desired performance. However, each parameter change will cause a change in the bandwidth and delay. In turn, this will also affect the mean-opinion-scores (MOS's) that are a subjective measurement of the video qualities.

The relationships between these performance parameters are not always linear. Each user of the user devices 100, 106 and 112 should know how to define a change in the video parameters needed to have a desired MOS goal. A user may also set default values in choosing these parameters or can negotiate with the controller to have the desired parameters or default values of the parameters determined (a network service provider may program the controller or use a live human being to assist the user to find the optimal parameter value that may satisfy the user's needs).

In step 603, if the parameter for scaling is requantization, the controller 201 goes to step 604; otherwise, the controller 201 goes to step 605. In step 604, the controller 201 determines the value of the requantization parameters necessary to achieve the selective performance parameters and continues to step 610. For example, the controller 201 determines the properties of the video signals that it receives and the properties of the video signals that it needs to send. The controller 201 then uses a lookup table, a mathematical algorithm, or any other generally known method to determine the value of the parameters needed to scale-down the video signals.

In step 605, if the parameter for scaling is frame rate reduction, the controller 201 goes to step 606; otherwise, the controller 201 goes to step 607. In step 606, the controller 201 determines the value of the frame rate reduction parameters necessary to achieve the selective performance parameters and continues to step 610 (FIG. 7). The controller 201 accomplishes the frame rate parameters determination in a manner similar to that described above with respect to step 604.

In step 607, if the parameter for scaling is DCT coefficient reduction, the controller 201 goes to step 608; otherwise, the controller 201 goes to step 609. In step 608, the controller 201 determines the value of the DCT coefficient reduction parameters necessary to achieve the selective performance parameters and continues to step 610. The DCT coefficient parameters determination is performed in a similar manner as that described above with respect to step 604.

In step 609, the parameter for scaling is presumed to be color reduction because it is the only other parameter for scaling that is specified in this exemplary operation. In step 609, the controller 201 determines the value of the color reduction parameters necessary to achieve the selective performance parameters and continues to step 610. The controller 201 determines the color reduction parameters in a manner similar to that described above with respect to step 604.

In step 610, the controller 201 determines whether the parameter used for scaling was sufficient to meet the selective performance parameters and continues to step 611. For example, the determination could merely be a comparison of the characteristics of the scaled-down video signal with the desired video signal. In step 611, if the scaling parameter was sufficient, the controller 201 continues to step 613; otherwise, the controller 201 goes to step 612.

In step 612, if the scaling parameter was not sufficient in scaling down the video signal to the available bandwidth for that user device, the controller 201 determines the next preferred parameter to use for further scaling the video signal. The determination of the next preferred scaling parameter may be based on the default parameters and user-selected preferences. The controller 201 then returns to step 603.

In step 613, the controller 201 determines whether there are any other user devices whose video signal transmissions to the same user device need to have a scaling transformation determined and continues to step 614. For example, the controller 201 would determine whether video signals from user devices 106 and 112 need to be scaled down before being transmitted to user device 100. In step 614, if there are other user devices with video signals that need to be scaled, the controller 201 returns to step 601; otherwise, the controller goes to step 615 and ends the scaling operation.

This invention expands the capability of multimedia conferencing to provide each end user with a different quality of service. Further the invention allows each operator of a user device to determine a preferred quality of service without affecting the quality of service of each of the other user devices.

As shown in FIG. 2, the method of this invention is preferably implemented on a programmed processor. However, the multimedia bridge 114 can also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device capable of implementing the flowcharts shown in FIGS. 4–7 can be used to implement the multimedia 114 functions of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of providing a multimedia conference between a plurality of user devices over a network, comprising:

setting performance parameters for each of the plurality of user devices, where the performance parameters are different among the user devices; and providing a multimedia conference among the plurality of user devices, wherein each of the plurality of user devices receives signals based on the performance parameters set for each of the plurality of user devices, and notifying the plurality of user devices when a change of the performance parameters will adversely affect the video signal being sent to the plurality of user devices, wherein the change of the performance parameters is based on at least one of a change in performance parameters by at least one user device and a change in network conditions.

2. A communication apparatus for providing a multimedia conference between a plurality of user devices over a network, comprising:

a controller; and a memory, wherein the controller sets performance parameters for each of the plurality of user devices, and wherein the controller provides a multimedia conference among the plurality of user devices, wherein each of the plurality of user devices receives signals based on the performance parameters for each of the plurality of user devices, wherein the controller notifies the plurality of user devices when a change of the performance parameters will adversely affect the video signal being sent to the plurality of user devices, wherein the change of the performance parameters is based on at least one of a change in performance parameters by at least one user device and a change in network conditions.

* * * * *